(12) United States Patent
Havas

(10) Patent No.: US 12,351,095 B2
(45) Date of Patent: Jul. 8, 2025

(54) LOAD HANDLING DEVICE FOR A TRANSPORTATION UNIT AND A TRANSPORTATION UNIT

(71) Applicant: Lifthanger Finland Oy, Oulu (FI)

(72) Inventor: Pertti Havas, Oulu (FI)

(73) Assignee: LIFTHANGER FINLAND OY, Oulu (FI)

( * ) Notice: Subject to any disclaimer, the term of this patent is extended or adjusted under 35 U.S.C. 154(b) by 0 days.

(21) Appl. No.: 18/868,811

(22) PCT Filed: May 22, 2023

(86) PCT No.: PCT/FI2023/000003
§ 371 (c)(1),
(2) Date: Nov. 25, 2024

(87) PCT Pub. No.: WO2023/227825
PCT Pub. Date: Nov. 30, 2023

(65) Prior Publication Data
US 2025/0162486 A1    May 22, 2025

(51) Int. Cl.
*B60P 1/54*    (2006.01)
(52) U.S. Cl.
CPC .................. *B60P 1/5495* (2013.01)
(58) Field of Classification Search
CPC ...................................... B60P 1/5495
See application file for complete search history.

(56) References Cited

U.S. PATENT DOCUMENTS

| | | | | | |
|---|---|---|---|---|---|
| 4,249,853 | A | * | 2/1981 | Lyvers | A61G 3/0808 |
| | | | | | 212/230 |
| 4,690,609 | A | * | 9/1987 | Brown | B60P 1/5452 |
| | | | | | 414/544 |
| 10,800,312 | B2 | * | 10/2020 | Havas | B60P 1/5495 |
| 2019/0299834 | A1 | * | 10/2019 | Havas | B60P 1/5419 |

FOREIGN PATENT DOCUMENTS

| | | | |
|---|---|---|---|
| DE | 2732256 A1 | 1/1979 | |
| DE | 3526039 A1 * | 1/1987 | |
| EP | 983899 A2 * | 3/2000 | ............ B60P 1/5442 |
| JP | 2003048476 A * | 2/2003 | |
| WO | WO2017212115 A1 | 12/2017 | |

OTHER PUBLICATIONS

Machine Language Translation into English of DE2732256 (A1).
Machine Language Translation into English of DE3526039 (A1).
Machine Language Translation into English of JP2003048476 (A).

* cited by examiner

*Primary Examiner* — Gerald McClain
(74) *Attorney, Agent, or Firm* — BelayIP

(57) ABSTRACT

A device for load handling can be installed in a transportation unit. The device comprises a holding arm, a support frame and a first rotation structure. The holding arm comprises a horizontal arm part, a vertical arm part and a handling head. The support frame comprises a first support frame side and a second support frame side. The second support frame side comprises a first end of the second support frame side and a second end of the second support frame side. The first rotation structure comprises a disk rotation unit for rotating the horizontal arm part. The diameter of the rotation unit is less than half of the length of the second support frame side, and the rotation unit is positioned nearer to the first support frame side than to the first end of the second support frame side.

16 Claims, 6 Drawing Sheets

LOAD HANDLING DEVICE FOR A TRANSPORTATION UNIT AND A TRANSPORTATION UNIT

CROSS REFERENCE TO RELATED APPLICATIONS

This application is a United States national phase application of International Application PCT/FI2023/000003, filed May 22, 2023, which claims priority to Finnish patent application FI20227070, filed May 25, 2022, the content of the both of which is herein incorporated by reference.

BACKGROUND OF THE INVENTION

Field of the Invention

The invention relates to a device for load handling, and the device is configured to be installed in a transportation unit, and the device comprises a holding arm, a support frame and a first rotation structure, and the holding arm comprises a horizontal arm part, a vertical arm part and a handling head, and the horizontal arm part comprises a first end of the horizontal arm part and a second end of the horizontal arm part, and the vertical arm part comprises a first end of the vertical arm part and a second end of the vertical arm part, and the support frame comprises a first support frame side and a second support frame side, and the second support frame side comprises a first end of the second support frame side and a second end of the second support frame side, and the first support frame side and the second support frame side are transverse to each other and the second end of the second support frame side is connected to the first support frame side, and the first rotation structure comprises a disk rotation unit for rotating the horizontal arm part, and the first end of the horizontal arm part is fixed to the rotation unit. The invention also relates to a transportation unit comprising a device according to the invention.

Description of Related Art

Cargo vehicles transport goods from their point of origin either to distribution terminals, intermediate storage facilities or directly to a final destination, such as a retailer or directly to the end user of the goods. Good examples of cargoes are crates and barrels. In a transportation unit, the goods may be placed on a so-called forklift pallet, or the goods may be equipped with other handling means, or the goods may have a shape that facilitates handling.

A conventional way to load and unload goods is to use a forklift, which by means of its forks lifts the goods by manipulating the pallet under the goods, which has openings for the forks of the forklift. If the goods are not on a forklift pallet and if the goods are round such as, for example, a paper roll, the forklift may be fitted with a two-arm gripper instead of forks.

However, sometimes the use of forklifts or other external transfer and cargo or load handling devices is not possible, simply because a loading site or unloading site has no forklift available. To obviate the problem, a forklift may be carried along inside the vehicle during the cargo transfer, for example at the back of the transportation unit, but this has drawbacks such as reducing the effective load that can be transported, which diminishes efficiency.

From publications U.S. Pat. No. 4,690,609 and US2008/277365, cargo handling devices integrated into a transportation unit of a vehicle are known. Publication U.S. Pat. No. 4,690,609 has a structure implemented with telescopic or otherwise successive linearly-moving arm parts in a 90-degree angle in relation to each other, which structure is suspended between two longitudinal tracks and being movable, in the direction of the tracks with a chain drive, back and forth in the direction of the cargo space of the vehicle. The other publication, US2008/277365, has a telescopic boom directly supported by a fixed round rim, in relation to which the telescopic boom rotates. The boom is supported by small connecting parts only, supported by which the boom is turnable in relation to a circular, fixed slide rail. Patent publication FI20165479 discloses a loading device having a disk suspension structure that is rotatable in relation to the frame of the loading device, and the loading arm of the device is fixed to the suspension structure. This is a stable but quite a big and heavy construction.

BRIEF SUMMARY OF THE INVENTION

An object of the invention is a solution that can significantly reduce the disadvantages and drawbacks of the prior art. In particular, the object of the invention is a device that improves loading and unloading vehicles transporting goods.

The invention is a device for load handling that can be installed in a transportation unit. The device comprises a holding arm, a support frame and a first rotation structure. The holding arm comprises a horizontal arm part, a vertical arm part and a handling head. The support frame comprises a first support frame side and a second support frame side. The second support frame side comprises a first end of the second support frame side and a second end of the second support frame side. The first rotation structure comprises a disk rotation unit for rotating the horizontal arm part. The diameter of the rotation unit is less than half of the length of the second support frame side, and the rotation unit is positioned nearer to the first support frame side than to the first end of the second support frame side.

When reference is made in the text to the upper or the lower parts or respective directions such as down or up, a situation is described in which the device according to the invention is in use. Also, when reference is made to the vertical or horizontal directions or surfaces, the device is placed similarly.

In one embodiment of the invention is a device for load handling. The device is configured to be installed in a transportation unit. The device comprises a holding arm, a support frame and a first rotation structure. The holding arm comprises a horizontal arm part, a vertical arm part and a handling head. The horizontal arm part comprises a first end of the horizontal arm part and a second end of the horizontal arm part, and the vertical arm part comprises a first end of the vertical arm part and a second end of the vertical arm part. The support frame comprises a first support frame side and a second support frame side. The second support frame side comprises a first end of the second frame support side and a second end of the second support frame side, and the first support frame side and the second support frame side are transverse to each other, and the second end of the second support frame side is connected to the first support frame side. The first rotation structure comprises a disk rotation unit for rotating the horizontal arm part, and the horizontal arm part is fixed to the rotation unit. In one advantageous embodiment of the invention, the diameter of the rotation unit is less than half of the length of the second support frame side, and the rotation unit is positioned nearer to the first support frame side than to the first end of the second support frame side. The device further comprises a second rotation structure for interconnecting the second end of the horizontal arm part and the first end of the vertical arm part.

In one embodiment of the device, the vertical arm part is telescopic.

In a second embodiment of the device, the horizontal arm part is made in one piece and its length is constant.

In a third embodiment of the device, the first rotation structure is configured in such a way that the horizontal arm part is rotatable by 360 degrees.

In a fourth embodiment of the device, the second rotation structure is configured in such a way that the vertical arm part is rotatable by 360 degrees around the longitudinal axis of the vertical arm part.

In a fifth embodiment of the device, the handling head is fixed to the second end of the vertical arm part by a joint arrangement, and the joint arrangements allows rotational movements of the handling head at least in the horizontal plane in relation to the vertical arm part.

In a sixth embodiment of the device, the support frame comprises a support side on the opposite side of the support frame in relation to the first support frame side, and the support side is shorter than the first support frame side.

In a seventh embodiment of the device, the length of the support side is less than 20% of the length of the first support frame side.

In an eighth embodiment of the device, the device further comprises a motor arrangement, and the motor arrangement is configured to enable at least some of the movements of the holding arm.

In a ninth embodiment of the device, the support frame is a flat structure having an upper side and a lower side, and the support frame comprises at least one opening extending from the upper side to the lower side. In a tenth embodiment of the device, the support frame comprises a third support frame side, and the first support frame side, the second support frame side and the third support frame side limit the opening.

In an eleventh embodiment of the device, the length of the horizontal arm part is less than or equal to the length of the second support frame side.

In one embodiment of the invention is a transportation unit of a vehicle comprising long side walls, short side walls and a roof, and the transportation unit has a longitudinal axis of symmetry. The transportation further comprises a device comprising a holding arm, a support frame and a first rotation structure. The holding arm comprises a horizontal arm part, a vertical arm part and a handling head. The support frame comprises a first support frame side and a second support frame side, and the support frame is configured in such a way that when the support frame is installed in the transportation unit the second support frame side extends from one long side wall to the opposite long side wall and the first support frame side is parallel to one long side wall. The first rotation structure comprises a disk rotation unit for rotating the horizontal arm part, and the horizontal arm part is fixed to the rotation unit. In one advantageous embodiment of the invention, the diameter of the rotation unit is less than half of the length of the second support frame side, and the rotation unit is positioned between the longitudinal axis of symmetry and the first support frame side, and the device further comprises a second rotation structure for connecting the second end of the horizontal arm part and the first end of the vertical arm part.

In one embodiment of the transportation unit, the support frame is attached in-between the opposing long side walls, and the support frame is configured to be movable in a direction between the short side walls, and the attachment points of the support frame are near the roof. In a second embodiment of the transportation unit, the transportation unit has a door arrangement on the long side wall or the short side wall or both, and the device is configured in such a way that the holding arm can be rotated out from the transportation unit and rotated back inside it through said door arrangements. In this case, length of the vertical arm part is less than width of the door arrangement.

It is an advantage of the invention that it provides a device that is able to load and unload transport units efficiently. Loading and unloading is also faster by using the invention than by using conventional methods or devices.

One advantage of the invention is that it is lighter and more durable than prior art devices. Also, friction is reduced.

It is a further advantage of the invention that it can be easily optimized for different kind of transport units.

BRIEF DESCRIPTION OF THE SEVERAL VIEWS OF THE DRAWINGS

Further advantageous features and details of the various embodiments of this disclosure will become apparent from the ensuring description of a preferred exemplary embodiment or embodiments and further with the aid of the drawings. The features and combinations of features recited below in the description, as well as the features and feature combination shown after that in the drawing description or in the drawings alone, may be used not only in the particular combination recited by also in other combinations on their own without departing from the scope of the disclosure.

In the following, the invention is described in detail. The description refers to the accompanying drawings, in which.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C".

The embodiments in the following description are given as examples only and someone skilled in the art can carry out the basic idea of the invention also in some other way than what is described in the description. Though the description may refer to a certain embodiment or embodiments in several places, this does not mean that the reference would be directed towards only one described embodiment or that the described characteristic would be usable only in one described embodiment. The individual characteristics of two or more embodiments may be combined and new embodiments of the invention may thus be provided.

Figure 1:
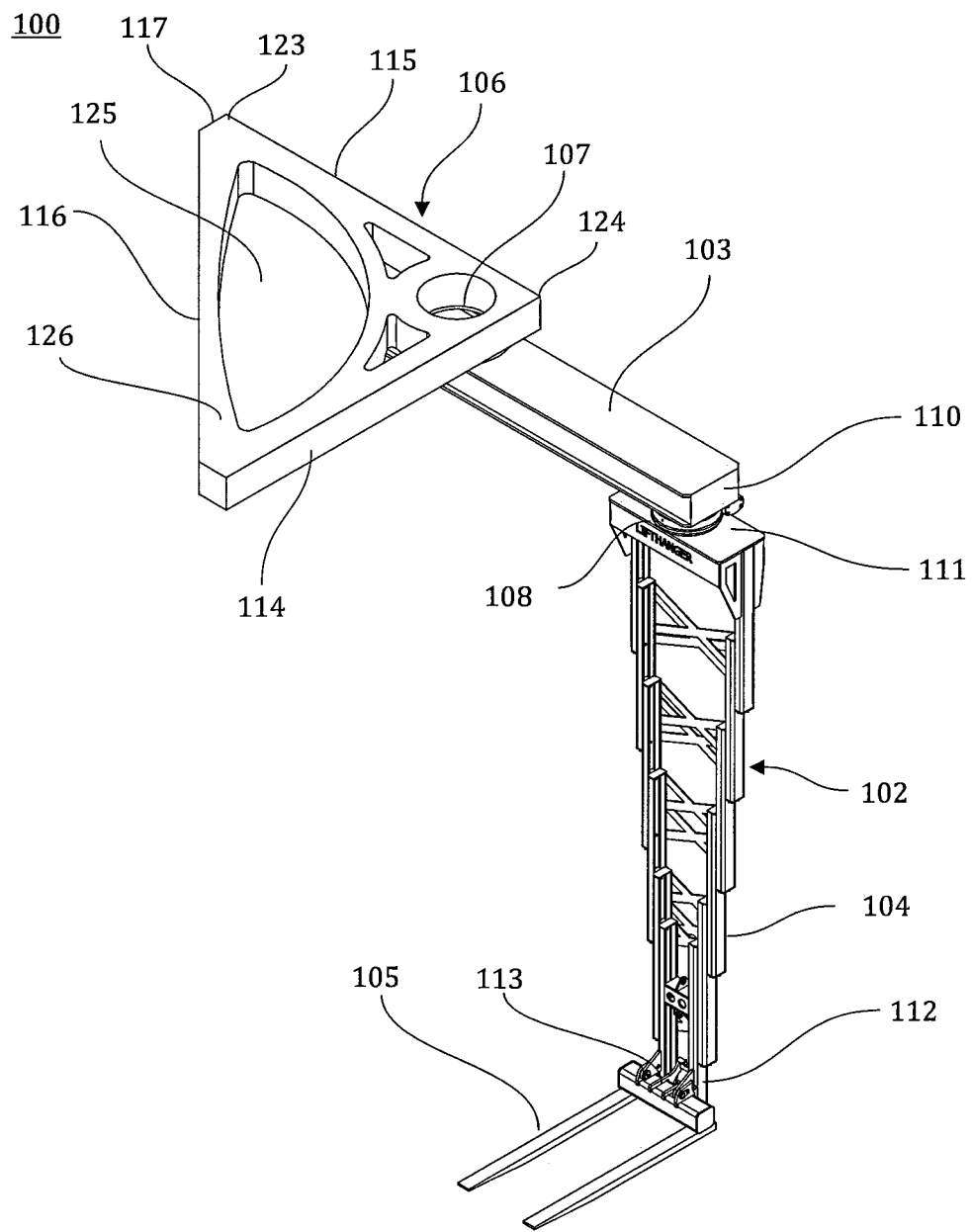
FIG. 1 shows an example of a device according to an embodiment.
Figure 2:
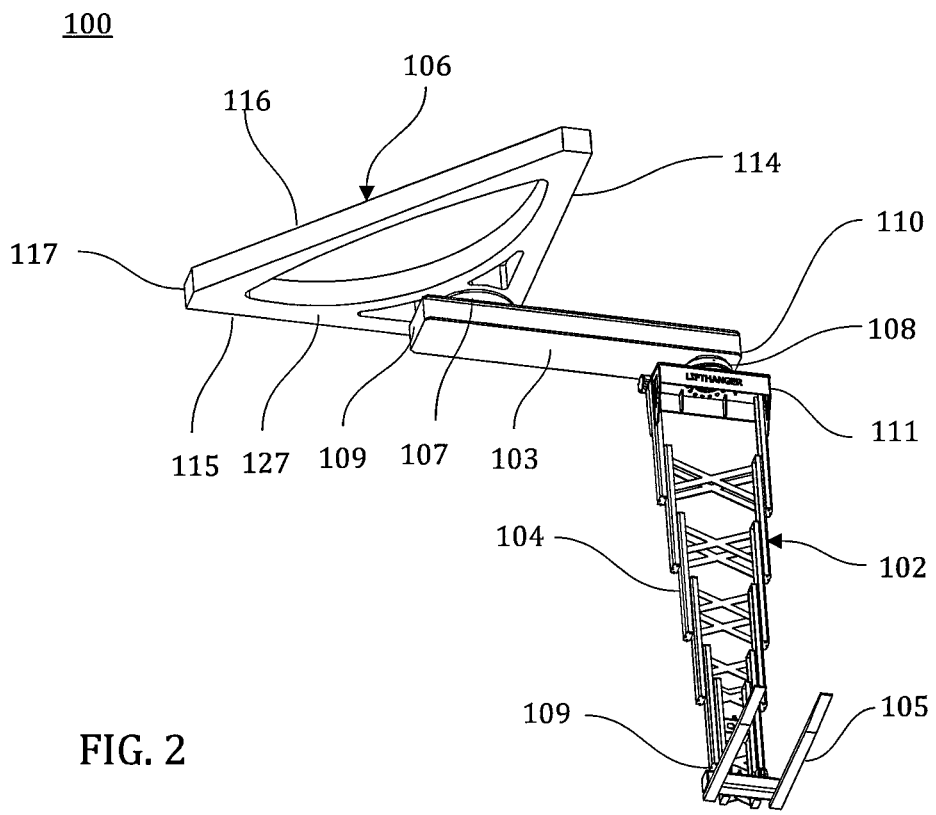
FIG. 2 shows the device of FIG. 1 as seen from below.
Figure 3:
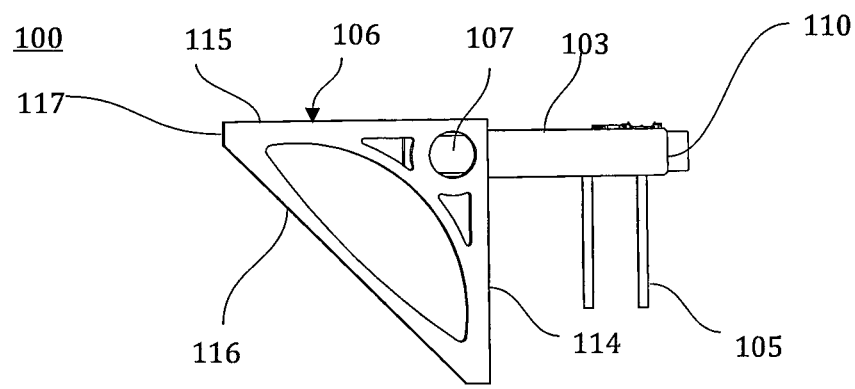
FIG. 3 shows the device of FIG. 1 as seen from above.

FIGS. 1, 2 and 3 show an embodiment of a device 100 for load and cargo handling, and the device is configured to be installed in a transportation unit. FIG. 1 shows the device obliquely from above, FIG. 2 shows the device obliquely from below, and FIG. 3 shows the device directly from above.

The device 100 comprises a holding arm 102, a support frame 106 and a first rotation structure 107. The holding arm comprises a horizontal arm part 103, a vertical arm part 104 and a handling head 105.

The support frame 106 is a flat structure and it supports the holding arm 102. The support frame is configured to be movable inside the transportation unit when the device 100 is in place. The support frame comprises a first support frame side 114, a second support frame side 115, a third support frame side 116, a support side 117, an upper side 126 and a lower side 127. The second support frame side comprises a first end of the second support frame side 123 and a second end of the second support frame side 124. When the device is in place inside the transportation unit, the second support frame side extends over the interior of the transportation unit. The first support frame side and the second support frame side are transverse to each other, i.e. they form a straight angle (90 degrees). The second end of the second support frame side is connected to the first support frame side. The support side 117 is on the opposite side of the support frame in relation to the first support frame side 114, and in this embodiment the support side is shorter than the first support frame side. The third support frame side 116 connects the first support frame side and the support side. Since in this embodiment the support side is significantly shorter than the first support frame side, the support frame has a triangular shape, and more particularly, it is shaped like a right triangle. The support frame comprises at least one opening 125 extending from the upper side to the lower side, i.e. the opening goes through the support frame.

The horizontal arm part 103 has a first end of the horizontal arm part 109 and a second end of the horizontal arm part 110. The vertical arm part 104 has a first end of the vertical arm part 111 and a second end of the vertical arm part 112. The ends of the arms mean here the areas in the vicinity of the ends of the arms. The sides of these areas are 20% of the length of the arm.

The horizontal arm part 103 is positioned horizontally. The horizontal arm part is a bar-like structure. It is essentially made in one piece. The horizontal arm part has an upper side of the horizontal arm part and a lower side of the horizontal arm part. This means that the length of the horizontal arm part is constant. The first end of the horizontal arm part 109 is attached to the support frame 106 by the first rotation structure 107. The first rotation structure is fixed to the upper side of the horizontal arm part. The horizontal arm part is rotatable in relation to the support frame, and the centre of rotation is at the first rotation structure. The length of the horizontal arm part is less than or equal to the length of the second support frame side 115. The fixing of the horizontal arm part to the first rotation structure is implemented in such a way that when the horizontal arm part is turned under the support frame parallel to the second support frame side, the ends of the horizontal arm part do not extend over the first support frame side 114 or the support side 117. At the second end of the horizontal arm part 110 is a second rotation structure 108 that is fixed to the lower side of the horizontal arm part.

The vertical arm part 104 is positioned vertically. The vertical arm part is a telescopic structure. This means that the height of the vertical arm part is adjustable. The vertical arm part comprises several sections that give it telescopic properties in the vertical arm part. The sections are essentially flat, and that means that the vertical arm part is also a flat structure. The first end of the vertical arm part 111 is fixed to the second end of the horizontal arm part 110 by the second rotation structure 108. The second rotation structure is configured in such a way that the vertical arm part is rotatable by 360 degrees around the longitudinal axis of the vertical arm part. At the second end of the vertical arm part 112 is the handling head 105. The handling head is fixed to the vertical arm part by a joint arrangement 113. The joint arrangement allows rotational movements of the handling head at least in the horizontal plane in relation to the vertical arm part.

In this embodiment, the handling head 105 comprises so-called forklift forks, which are a pair of metal tines, which, when the device 100 is being used, are pushed into the corresponding openings in a pallet that is being handled. The handling head is rotatably fastened to the joint arrangement 113 with respect to the end of the handling arm. The handling head can be folded, rotated, or tilted by the joint arrangement. In some embodiments, the handling head is implemented differently depending on the properties of the load or cargo that the device is meant to manipulate.

The first rotation structure 107 is attached to the support frame 106. The first rotation structure comprises a disk rotation unit for rotating the horizontal arm part. The horizontal arm part 109 is fixed to the rotation unit. The diameter of the rotation unit is less than half of the length of the second support frame side 115. The first rotation structure is positioned in relation to the support frame in such a way that the rotation unit is nearer to the first support frame side 114 than to the first end of the second support frame side 123. In an advantageous embodiment, the first rotation structure is positioned near the corner formed by the first support frame side and the second support frame side 115. The phrase 'near the corner' means that the first rotation structure is in a rectangular area having sides with lengths that are half of the length of the second support frame side and one corner of said area coincides with the connection point of the first support frame side 114 and the second support frame side 115, i.e. the second end of the second support frame side 124.

Movements of the holding arm 102 and the first rotation structure 107 are enabled by a motor arrangement (not presented in FIGS. 1 to 3) that is attached to the device 100. The motor arrangement comprises one or more motors, preferably electric motors and power transfer arrangements. The power transfer arrangements may be hydraulic, pneumatic or mechanical arrangements. Also, in some embodiments, different combinations of power transfer arrangements are used. The device comprises a battery or another power supply unit for the motor arrangement. In some embodiments, the power supply is implemented by an external unit that has a connection arrangement to the motor arrangement. For moving the support frame 106, the device comprises a transfer motor or has a connection arrangement to the transfer motor that is located in the transportation unit.

In some embodiments, the power for the motor arrangement and the transfer motor is provided by a vehicle that is providing motion to the transportation unit. In some embodiments, the motor arrangement and the transfer motor are the same unit and power for moving the device is transferred to the moving parts of the device by the power transfer arrangements.

The device 100 comprises a control unit. The control unit may be implemented with a processor and/or programmable logic component. The user of the device, such as the vehicle driver, may operate a wireless user interface by means of which he or she controls the control unit, the transfer motor, the rotating structures, and other device structures, such as the handling arm 102. The user interface may be implemented with a portable device, such as a tablet computer, a smart phone, or a portable computer.

Figure 4:
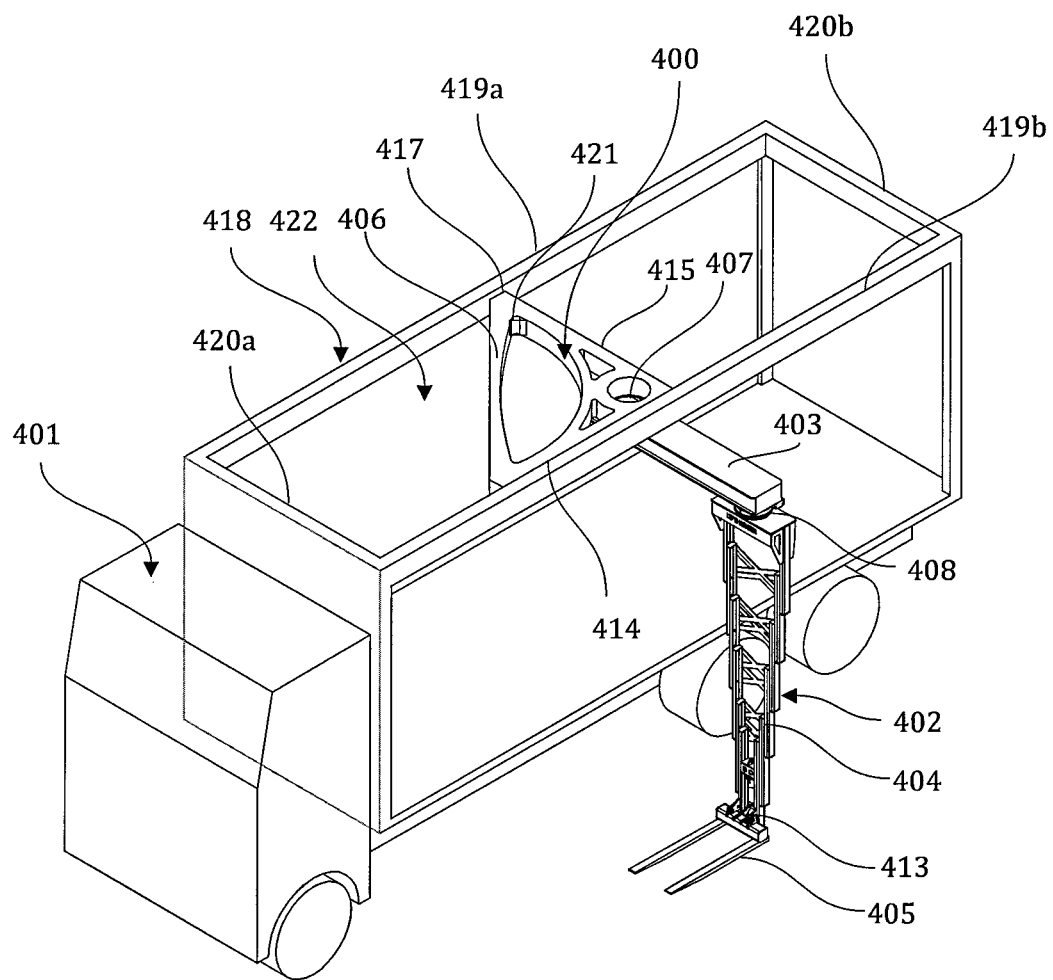
FIG. 4 shows a second example of a device according to an embodiment.

FIG. 4 shows an embodiment of a transportation unit 418 of a vehicle 401. In the embodiments of FIG. 4, the vehicle is a truck, but possible embodiments are not limited to that. The vehicle may be, for example an articulated vehicle, a van or train, and a transportation unit may be fixed to the vehicle, or it may be, for example, take the form of a trailer, as in a detachable transportation unit. The transportation unit is an elongated box-like structure for transporting different load and cargoes, such as a container. The transportation unit comprises long side walls 419a, 419b, short side walls 420a, 420b and a roof 422. For sake of clarity, some of the walls and the roof are transparent. The transportation unit has at least one door arrangement on the long side wall or on the short side wall. The positioning of the door arrangement or arrangements depend on how the transportation unit is attached to the vehicle. On the edges of the transportation unit are beams or other supporting frame structures.

The transportation unit 418 further comprises a device 400. The device comprises a holding arm 402, a support frame 406 and a first rotation structure 407. The holding arm comprises a horizontal arm part 403, a vertical arm part 404 and a handling head 405. The support frame comprises a first support frame side 414, a second support frame side 415 and a support side 417. The support frame is configured in such a way that when the device is installed in the transportation unit, the second support frame side extends from one long side wall to the opposite long side wall and the first support frame side is parallel to one long side wall. The support side is parallel to the other long side wall. The horizontal arm part is attached to the first rotation structure. The holding arm further comprises a second rotation structure 408 and a joint arrangement 413. The second rotation structure interconnects the vertical arm part and the horizontal arm part in such a way that the horizontal arm part is rotatable around its longitudinal axis. The joint arrangement interconnects the horizontal arm part and the handling head in such a way that the handling head is movable in relation to the vertical arm part.

The support frame 406 is movable in a direction between the short side walls 420a, 420b. The support frame is positioned near the roof 422. In some embodiments, there are rails on both long side walls 419a, 419b, and the first support frame side 414 and the support side 417 are configured to slide along these rails when the device 400 is moved. The rails may be attached to the supporting frame structures near the roof or the rails may be part of the supporting frame structures. For example, the rails can be H-beams that are fixed to the long side walls and the first support frame side 414 and the support side 417 are fitted into the grooves of the H-beams. The friction forces caused by the support side are less than the friction forces caused by the first support frame side, because the support side is shorter than the first support frame side. This means that the total friction forces are reduced by using the support frame according to the embodiment. Also, the total weight of the device is less than those of the prior art devices.

In FIG. 4 the device 400 is positioned in such way that the holding arm 402 is extending out of the transportation unit 418. In the long side wall 419b is the door arrangement (not explicitly disclosed in FIG. 4) that is open. The horizontal arm part 403 is rotated in a position where the horizontal arm part is parallel to the second support frame side 415 (and transverse to the first support frame side 414) and pointing out from the transportation unit. The vertical arm part 404 is extended over such a distance that the handling head 405 is approximately at ground level and is pointing towards the front end of the vehicle 401. If there is a pallet in front of the handling head, the support frame 406 is moved toward the front end of the vehicle until the forks of the handling head are under the pallet. Then the pallet is lifted by retracting the vertical arm part until the bottom of the pallet is above the level of the floor of the transportation unit. The carried pallet is moved inside the transportation unit by moving the support frame 406 and rotating the horizontal arm part. Then the pallet is carried to a suitable place inside the transportation unit with similar movements. Then the handling head is lowered and pulled out from under the pallet. When unloading the pallet, these phases are done on in the opposite order. In some embodiments, length of the vertical arm part is less than width of the door arrangement.

Figure 5:
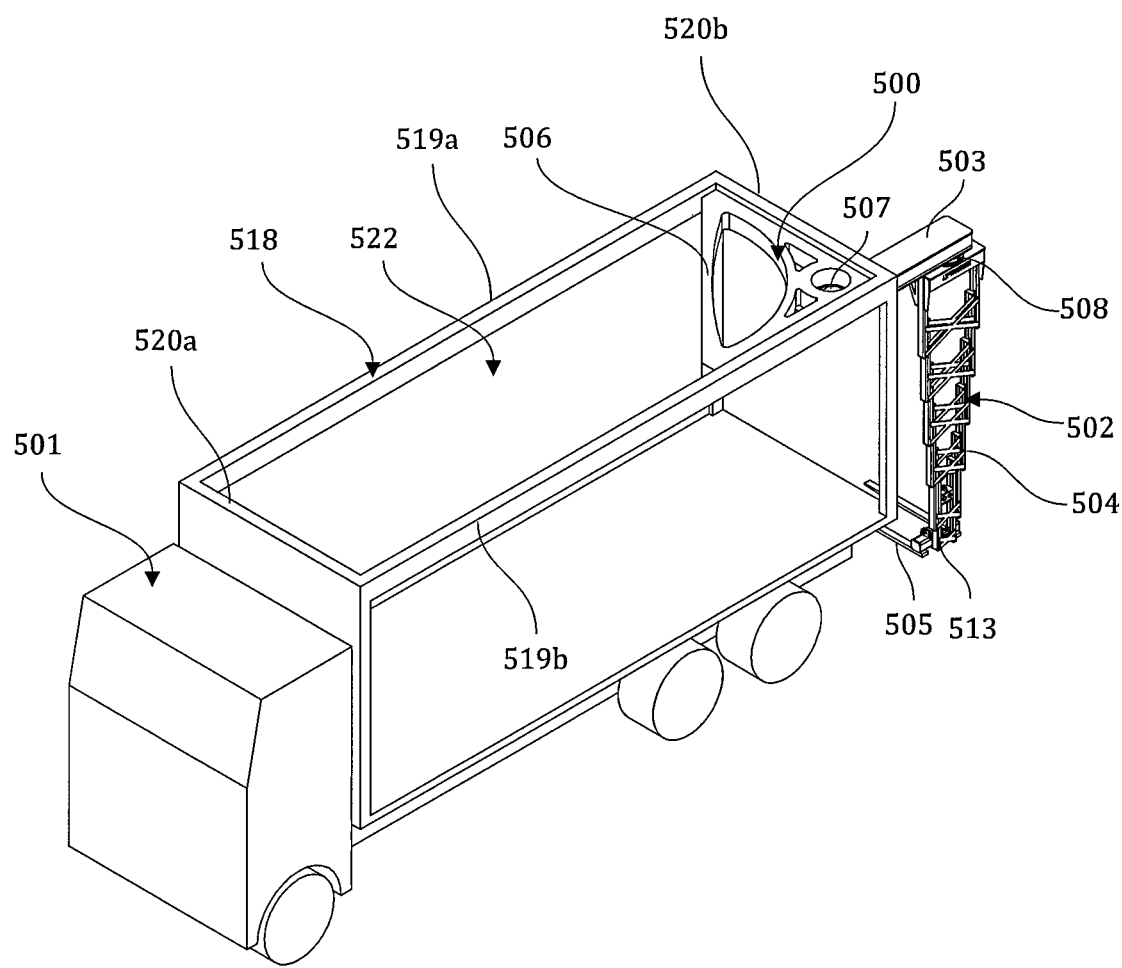
FIG. 5 shows a third example of a device according to an embodiment.

FIG. 5 shows an embodiment of a transportation unit 518 of a vehicle 501. The transportation unit comprises long side walls 519a, 519b, short side walls 520a, 520b and a roof 522. The short side walls are the front short side wall 520a and the rear short side wall 520b. The front short side wall is near the front end of the vehicle. In this embodiment, the rear short side wall is at least partially openable, i.e. it has a door arrangement.

The transportation unit 518 further comprises a device 500. The device comprises a holding arm 502, a support frame 506 and a first rotation structure 507. The holding arm comprises a horizontal arm part 503, a vertical arm part 504 and a handling head 505. The holding arm further comprises a second rotation structure 508 and a joint arrangement 513.

In FIG. 5, the door arrangement is open and the handling arm 502 extends out of the door arrangement. The horizontal arm part 503 is rotated to a position where it is parallel to the longitudinal axis of the transportation unit. The vertical arm part 504 is extended to such a length that the handling head 505 is near the ground. If the handling head is carrying, for example, a pallet that is being unloaded from the transportation unit 518, a forklift can take it over. Alternatively, the handling head can be rotated to point away from the transportation unit and then the support frame 506 is moved towards the front short side wall 520a and the handling head pulled out from under the pallet. Loading the transportation unit is done in a similar way but in the opposite order.

Figure 6A:
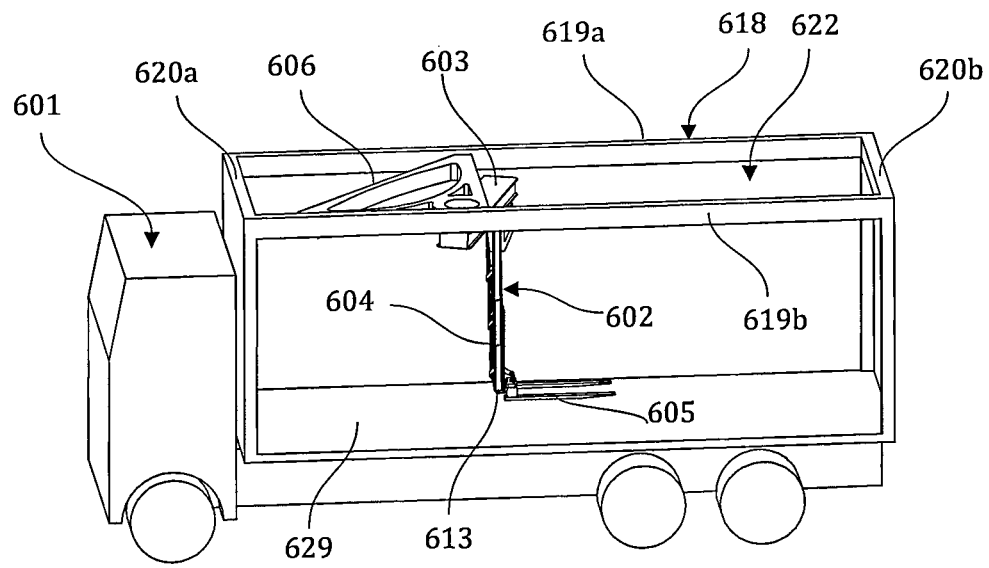
FIG. 6a shows a fourth example of a device according to an embodiment as seen from the side.
Figure 6B:
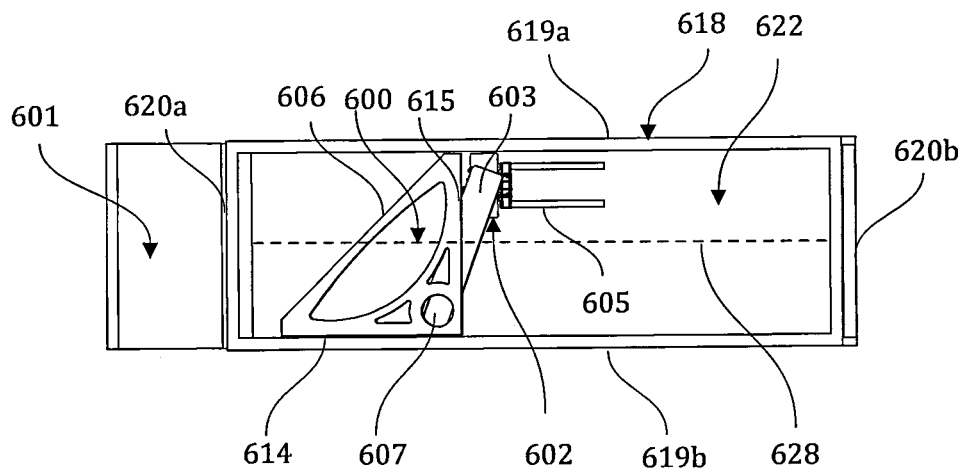
FIG. 6b shows the device of FIG. 6a as seen from above.

FIG. 6 shows an embodiment of a transportation unit 618 of a vehicle 601. FIG. 6a shows the transportation unit and the vehicle as seen from the side. FIG. 6b shows the transportation unit and the vehicle as seen above. The transportation unit comprises long side walls 619a, 619b, short side walls 620a, 520b, a floor 629 and a roof 622. The long side walls are longer than the short side walls. The transportation unit has a longitudinal axis of symmetry 628. The transverse distances to the opposing long side walls from the longitudinal axis of symmetry are equal, i.e. the longitudinal axis of symmetry divides the transportation unit into two equal parts. It must be noted that symmetry of the transportation unit means dimensions of the transportation unit.

The transportation unit 618 further comprises a device 600. The device comprises a holding arm 602, a support frame 606 and a first rotation structure 607. The holding arm comprises a horizontal arm part 603, a vertical arm part 604, a handling head 605 having forks and a joint arrangement 613. The first rotation structure comprises a disk rotation unit for rotating the horizontal arm part, and the horizontal arm part is fixed to the rotation unit. The rotation unit is a part of the first rotation structure. The support frame has a first support frame side 614 and a second support frame side 615. The first support frame side is alongside one long side wall and the second support frame side extends from one long side wall to another long side wall. The diameter of the rotation unit is less than half of the length of the second support frame side, and the rotation unit is positioned between the longitudinal symmetry axis 628 and the first support frame side. The position of the rotation unit is also such that the centrepoint of the rotation unit is in a rectangular area having sides with lengths that are a quarter of the length of the second support frame side 615 and one corner of said area coincides with the corner of support frame 606, as formed by the first support frame side and the second support frame side.

FIG. 6 discloses a situation when the device 600 is inside the transportation unit 618. The device is about to be readied for storage when the transportation unit is moved. The horizontal arm part 603 is rotated by the first rotation structure 607 toward a position where the horizontal arm part is parallel to the second support frame side 615. The vertical arm part 604 is in a position where the handling head 605 is near the floor 629 of the transportation unit 618 and the forks of the handling head are pointing in a horizontal direction. The vertical arm part is rotated into a position where it is in the closest position in relation to the long side wall 619a. This means that when the horizontal arm part is parallel to the second support frame side, the forks of the handling head point away from the said long side wall. Then vertical arm part is retracted to its minimum length and the joint arrangement 613 is used to turn the handling head alongside the long side wall, i.e. to a position where the forks are approximately parallel to the long side wall. The device 600 can be moved to either end of the transportation unit. In those positions the device occupies a minimum of space inside the transportation unit.

Figure 7:
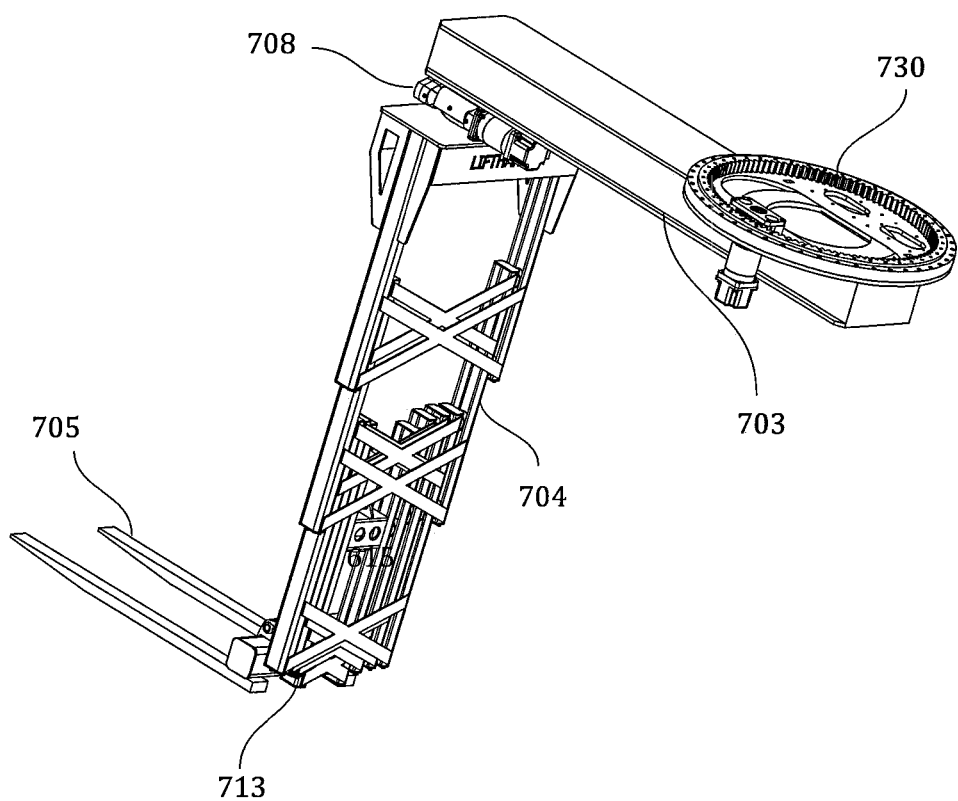
FIG. 7 shows an example of a handling arm device according to an embodiment.

FIG. 7 shows an embodiment of a handling arm 702. The handling arm is a part of a device for load and cargo handling for a transportation unit. The device comprises a support frame and a first rotation structure for rotating the handling arm in relation to the support frame.

The holding arm 702 comprises a horizontal arm part 703, a vertical arm part 704 and a handling head 705. The holding arm further comprises a rotation unit 730, a second rotation structure 708 and a joint arrangement 713. The horizontal arm part and the vertical arm part are connected to each other with the second rotation structure. The second rotation structure rotates the vertical arm part in such a way that the longitudinal axis of the second rotation structure is the axis of rotation. The vertical arm part can be rotated by 360 degrees. The vertical arm part and the handling head are interconnected by the joint arrangement, which allows the handling head to rotate in the horizontal plane. Also, the joint arrangement is able to rotate the handling head in a vertical plane. Advantageously, the joint arrangement is configured to rotate the handling head to at least one position where the handling head is approximately parallel to the vertical arm part. The vertical arm part comprises several sections that are configured to slide inside each other, thus providing a telescopic effect. These sections are flat, and thus the vertical arm part is also flat. In FIG. 7, the vertical arm part is partly retracted.

The rotation unit 730 is a disk structure having a centrepoint. The rotation unit is fixed to the horizontal arm part 703 and movably connected to the first rotation structure. In this embodiment, the rotation unit comprises a rim having teeth inside the rim. The first rotation structure comprises a counterpart that is configured to rotate the rotation unit and the horizontal arm part. The first rotation structure also comprises arrangements that support the rotation unit and the holding arm 702. These arrangements are configured to bear the weight of the holding arm and the cargo that the holding arm is carrying. The rotation unit and the first rotation structure can be implemented in many different ways, but what is essential is that the rotation unit is fixed to the horizontal arm part, and the first rotation structure rotates the rotation unit.

In some embodiments, the holding arm 702 comprises power connection arrangements for the second rotation structure 708 and the joint arrangement 713. These are connected to a power source or a motor arrangement or similar in the device or the transportation unit. The power connection arrangements are configured to run through the rotation unit 730 in such a way that the rotations of the holding arm do not twist the power connection arrangements.

Finally, it should be noted that the description of the invention and the exemplary embodiments are not to be understood as limiting in terms of a particular physical realisation of the invention. The scope of protection of the present invention is given by the claims and is not limited by the features illustrated in the description or shown in the figures.

The invention claimed is:

1. A device configured to handle load cargo and to be installed in a transportation unit, the device comprises:
   a holding arm,
   a support frame, and
   a first rotation structure, and wherein
   the holding arm comprises a horizontal arm part, a vertical arm part and a handling head,
   the horizontal arm part comprises a first end of the horizontal arm part and a second end of the horizontal arm part,
   the vertical arm part comprises a first end of the vertical arm part and a second end of the vertical arm part,
   the support frame comprises a first support frame side and a second support frame side,
   the second support frame side comprises a first end of the second support frame side and a second end of the second support frame side,
   the first support frame side and the second support frame side are arranged transverse to each other and the second end of the second support frame side are arranged connected to the first support frame side,
   the first rotation structure comprises a disk rotation unit for rotating the horizontal arm part,
   the horizontal arm part is fixed to the rotation unit,
   the diameter of the rotation unit is less than half of the length of the second support frame side,
   the rotation unit is positioned nearer to the first support frame side than to the first end of the second support frame side, the support frame comprises a support side on opposite side of the support frame in relation to the first support frame side, the support side is shorter than the first support frame side; and the horizontal arm part is supported by the support frame at only the first rotation structure.

2. The device according to claim 1, wherein the vertical arm part is telescopic.

3. The device according to claim 1, further comprising a second rotation structure configured to interconnect the second end of the horizontal arm part and the first end of the vertical arm part.

4. The device according to claim 1, wherein the horizontal arm part comprises one piece with a constant length.

5. The device according to claim 1, wherein the first rotation structure is configured such that the horizontal arm part is rotatable by 360 degrees.

6. The device according to claim 3, wherein the second rotation structure is configured such that the vertical arm part is rotatable by 360 degrees around a longitudinal axis of the vertical arm part.

7. The device according to claim 1, wherein the handling head is arranged fixed to the second end of the vertical arm part by a joint arrangement, and the joint arrangement is configured to enable rotational movements of the handling head at least in horizontal plane in relation to the vertical arm part.

8. The device according to claim 1, wherein a length of the support side is less than 20% of a length of the first support frame side.

9. The device according to claim 1, further comprising a motor arrangement configured to enable at least some of the movements of the holding arm.

10. The device according to claim 1, wherein the support frame comprises a flat structure having an upper side, a lower side, at least one opening extending from the upper side to the lower side.

11. The device according to claim 10, wherein:
the support frame comprises a third support frame side, and
the first support frame side, the second support frame side, and the third support frame side are configured to limit the opening.

12. The device according to claim 1, wherein a length of the horizontal arm part is less than or equal to length of the second support frame side.

13. A transportation unit of a vehicle, comprising:
long side walls,
short side walls, and
a roof, and wherein
the transportation unit further comprises a longitudinal symmetry axis, and a device comprising a holding arm, a support frame and a first rotation structure,
the holding arm further comprises a horizontal arm part, a vertical arm part and a handling head,
the support frame further comprises a first support frame side and a second support frame side,
the support frame is further configured such that when the support frame is installed on the transportation unit, the second support frame side extends from one long side wall to the opposite long side wall and the first support frame side is parallel to one long side wall,
the first rotation structure further comprises a disk rotation unit configured to rotate the horizontal arm part,
the horizontal arm part is further arranged fixed to the rotation unit,
the diameter of the rotation unit is less than half of the length of the second support frame side,
the rotation unit is arranged between the longitudinal symmetry axis and the first support frame side, and
the support frame comprises a support side on an opposite side of the support frame to the first support frame side,
the support side is shorter than the first support frame side; and
the horizontal arm part is supported by the support frame at only the first rotation structure.

14. The transportation unit according to claim 13, wherein:
the support frame is arranged between the opposing long side walls is configured to be movable in a direction between the short side walls, and
the attachment points of the support frame are arranged near the roof.

15. The transportation unit according to claim 13 wherein:
the transportation unit comprises a door arrangement on the long side wall or the short side wall or both, and
the device is further configured such that the holding arm is configured to rotate out of the transportation unit and back inside it through the door arrangements.

16. The transportation unit according to claim 13, wherein the device further comprises a second rotation structure configured to interconnect the second end of the horizontal arm part and the first end of the vertical arm part.

* * * * *